Sept 17, 1957     J. H. LOVELAND     2,806,605
BICYCLE RACK
Filed March 17, 1954
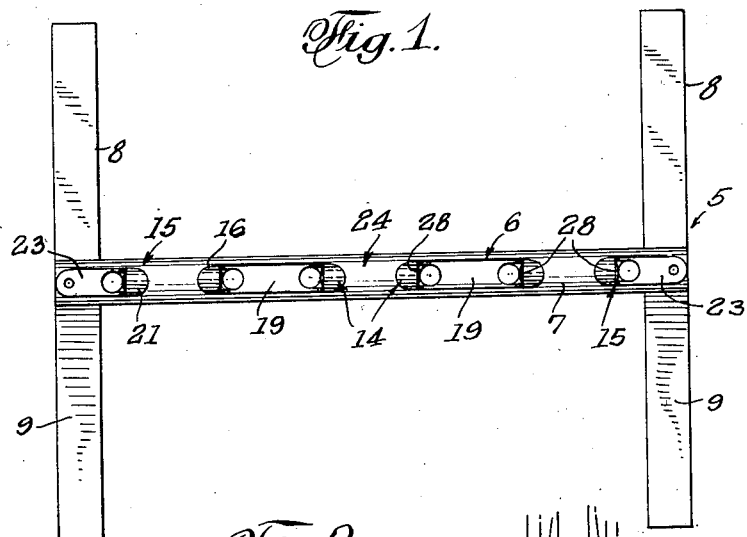
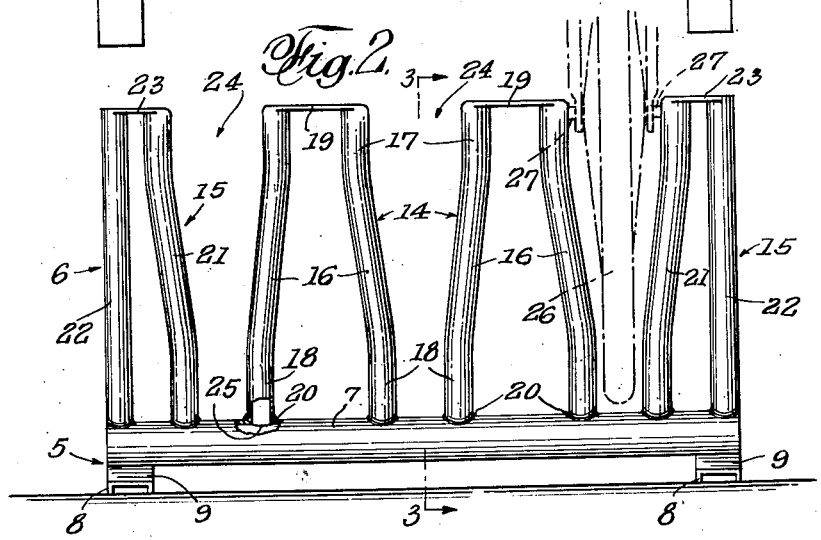
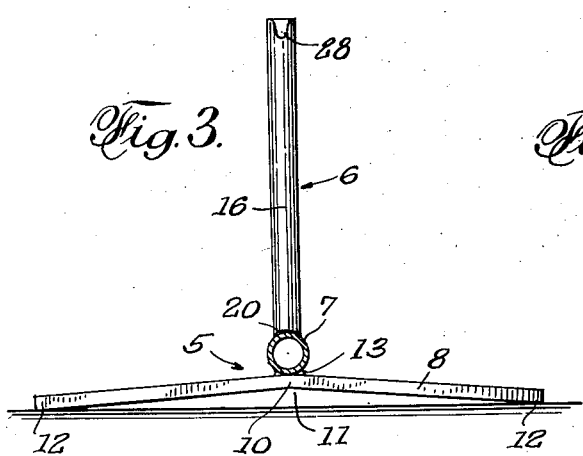
INVENTOR.
JOHN H. LOVELAND
BY C. G. Stratton
ATTORNEY

United States Patent Office 2,806,605
Patented Sept. 17, 1957

2,806,605

BICYCLE RACK

John H. Loveland, Gardena, Calif.

Application March 17, 1954, Serial No. 416,921

2 Claims. (Cl. 211—22)

This invention relates to a rack to support bicycles in upright position.

An object of the present invention is to provide a bicycle rack that is particularly characterized by its simplicity of construction and low cost of production.

Another object of the invention is to provide a bicycle rack that is stable and, therefore, strongly resists tipping over.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a top plan view of a bicycle rack according to the present invention.

Fig. 2 is a front elevational view thereof.

Fig. 3 is a cross-sectional view as taken on line 3—3 of Fig. 2.

Fig. 4 is an enlarged fragmentary sectional view of a structural detail.

The bicycle rack that is illustrated comprises, generally, a base 5, and an aligned set of holders 6 arranged in upright position on said base.

The base 5 is shown as comprising an elongated tubular member 7 that may be advantageously made of a suitable length of pipe or steel tubing. The ends of said member are left open. At the ends of member 7 and transverse thereto, there are provided foot members 8 that are shown as comprising channel members having their webs 9 uppermost as shown. As can be seen in Fig. 3, said channel foot members are each provided with a bend 10 midway between the ends to provide the same with an extremely obtuse included angle 11. Thus, the foot members 9 each have spaced ends 12 that are adapted to engage a support surface and an intermediate portion 10 elevated thereabove. Suitable welds 13 connect the ends of tubular member 7 to said portions 10 of foot members 8. The H-shaped base thus provided is extremely stable.

The holders 6 are preferably made in two forms, such as intermediate holders 14 and end holders 15.

Each holder 14 comprises two identical lengths of pipe or tubing 16 each provided with an ogee type of bend that offsets one end 17 from the opposite end 18. By arranging said two pipes in opposed relation so that ends 17 are closer together than are ends 18 and connecting the ends 17 as by a strap 19 or the like, suitable welds being used for this purpose, the holders 14 are fabricated and comprise two ends—the ends 18 of the pipes 16—that are adapted to be applied to the tubular member 7 and affixed thereto as by welds 20.

The end holders 15 differ in form from the holders 14 in that one pipe 21 is bent to ogee form as are pipes 16 and the other pipe 22 is straight, the pipes 21 and 22 being connected by a strap 23 similar to but shorter than straps 19. The holders 15 are affixed to tubular member 7 as are holders 14.

It will be clear from the foregoing that adjacent holders, formed as above, define between them spaces 24 that are wider at the top than at the bottom by reason of the ogee bends in members 16 and 21.

Before the holders 14 and 15 are welded to tubular member 7, the latter is provided with a set of holes 25 that are spaced according to the spacing of pipe ends 18. Thus, any moisture, as rain, etc., that may enter the holder pipes will drain downwardly through openings 25 into tubular member 7 and outwardly of the open ends of said member.

The wheel 26 of a bicycle is adapted to occupy each space 24 and the axle ends 27 of said wheel are adapted to be entered from above into seats 28 provided in the upper inwardly facing portions of ends 17 of pipes 16 and 21. Said seats 28 are arranged in pairs and constitute saddles that engage and support axle ends 27 in a manner to keep wheel 26 otherwise clear of other portions of the rack.

The rack thus provided may be approached from either side and it is preferred that bicycles be placed in the rack alternately from opposite sides.

The rack illustrated has places for three bicycles and it will be understood that merely increasing the rack capacity will, in no wise, change the construction or arrangement.

While the foregoing illustrates and describes what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A bicycle rack comprising a base provided with a horizontal open-ended tubular member, a set of aligned tubular members affixed in substantially upright position on said horizontal tubular member, said upright members being open-ended and in moisture-draining connection with the horizontal member, a strap connecting the upper ends of said upright members in pairs to provide spaced bicycle holders that each comprise two of said upright members and a connecting strap, and the upper end of each upright member of each bicycle holder being provided with a seat on the side thereof directed toward the upright member of an adjacent bicycle holder, said seats being adapted to receive the axle ends of the wheel of a bicycle disposed in the space between the holders.

2. A bicycle rack according to claim 1: the tubular members of each strap-connected pair thereof being spaced farther apart where the same connect to the horizontal tubular member than where connected by the strap, the spaces thus formed between adjacent bicycle holders being narrower adjacent the horizontal member where the rim of the mentioned wheel is adapted to reside and wider between the mentioned axle-receiving seats.

References Cited in the file of this patent

UNITED STATES PATENTS

| 588,291 | Porter | Aug. 17, 1897 |

FOREIGN PATENTS

| 7,439 | Great Britain | of 1897 |
| 18,435 | Great Britain | of 1897 |
| 25,468 | Great Britain | of 1902 |